July 15, 1952 — J. P. BUTTERFIELD — 2,603,538

BEARING BLOCK STRUCTURE

Filed March 24, 1948 — 4 Sheets-Sheet 1

INVENTOR.
John P. Butterfield
BY
Harness & Harris
ATTORNEYS.

July 15, 1952 J. P. BUTTERFIELD 2,603,538
BEARING BLOCK STRUCTURE
Filed March 24, 1948 4 Sheets-Sheet 2

INVENTOR.
John P. Butterfield
BY
Harness & Harris
ATTORNEYS.

July 15, 1952      J. P. BUTTERFIELD      2,603,538
BEARING BLOCK STRUCTURE

Filed March 24, 1948      4 Sheets-Sheet 3

INVENTOR.
John P. Butterfield
BY
Harness & Harris
ATTORNEYS

July 15, 1952 J. P. BUTTERFIELD 2,603,538
BEARING BLOCK STRUCTURE
Filed March 24, 1948 4 Sheets-Sheet 4
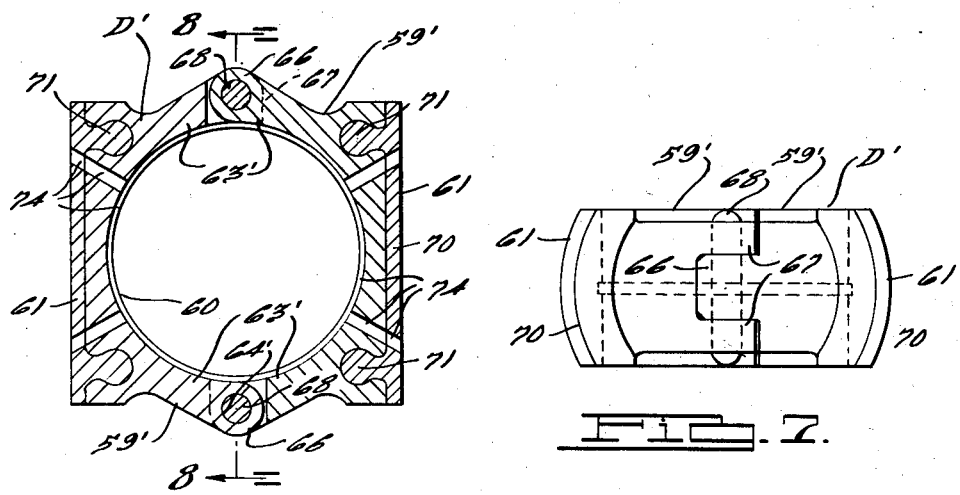
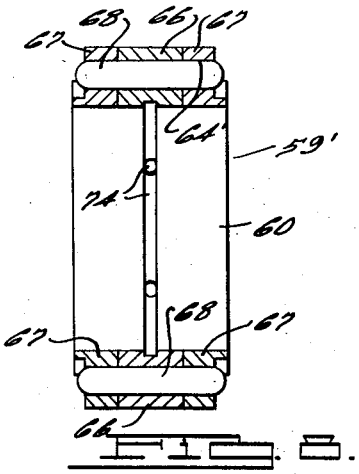
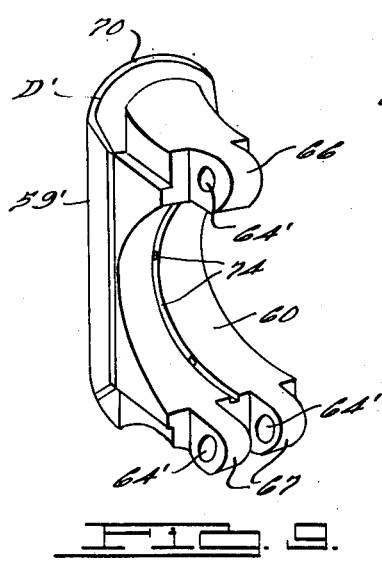
INVENTOR.
John P. Butterfield
BY
Harness & Harris
ATTORNEYS Patented July 15, 1952

2,603,538

UNITED STATES PATENT OFFICE 2,603,538

BEARING BLOCK STRUCTURE

John P. Butterfield, Grosse Pointe Woods, Mich., assignor to Chrysler Corporation, Highland Park, Mich., a corporation of Delaware Application March 24, 1948, Serial No. 16,648

2 Claims. (Cl. 308—3)

This invention relates primarily to internal combustion engines of the double acting type.

In the double acting type of engine a double piston is employed for reciprocatory movement in a cylinder bore, such engines being arranged to provide a combustion chamber at each end of the cylinder for cooperation with one end of the double piston. Engines of this general type are known in the art and employ a crankshaft which is directly operably connected to the double piston without the use of a connecting rod such as is used in the more conventional type of engine.

The double acting type of engine offers many advantages over the more conventional types of engines but certain difficulties in the manufacture and operation of such an engine have heretofore been deemed to be of such serious and unsurmountable character as to cause this type of engine to either be discarded or not worth the expenditure of effort necessary to overcome the problems involved.

One of the difficulties experienced in this type of engine is in providing a practicable operating connection between the piston and crankshaft. In the past, such connections have been unsatisfactory in that they are subject to undue wear, rattle, breakage, and binding of the engaged parts due to ordinary deflections in the crankshaft and as a result of the inability, as a practical matter, to maintain the necessary exactness in the relative alignment or relationship of the axes of the cylinder, piston, crankshaft, crank portion of the crankshaft, the piston slideway, and the bearing member between the slideway and crank portion. Even when such parts were made to the best of shop tolerances binding of the parts was unavoidable and the aforesaid difficulties could not be avoided. Such problems and difficulties would be greatly multiplied if such engines were manufactured in regular production with modern facilities.

It is accordingly an object of my invention to provide an improved operating connection between the piston and crank portion of the crankshaft which will overcome the aforesaid problems and disadvantages. My invention provides an operating connection which is capable of manufacture with ordinary shop facilities and which, upon assembly in the engine, will readily and freely compensate for the usual inaccuracies of manufacture thereby to relieve binding tendencies in the various moving parts.

A further object is to provide an operating connection which will not rattle and which will be capable of use, without failure or damage, over long periods heretofore not attained by operating connections known prior to my invention.

Another object is to provide an engine having improved compactness whereby, for a given power output, my engine will occupy less space and will be less costly to manufacture.

An additional object is to provide an improved assembly of piston and crankshaft having less than conventional friction losses and having an improved degree of compactness.

Another object is to provide an improved bearing block structure for connecting a crankshaft and piston.

Further objects are to provide an improved bearing block for the operating connection, and a bearing block having interchangeable component portions.

Further objects and advantages of my invention reside in the novel combination and arrangement of parts hereinafter described as illustrative of the principles of my invention, reference being had to the accompanying drawings in which:

Fig. 6 is a view corresponding to Fig. 4 showing a modified bearing block structure.

Fig. 7 is an end elevational view of the Fig. 6 structure.

Fig. 8 is a sectional view according to line 8—8 of Fig. 6.

Fig. 9 is a perspective view of one of the complementary interchangeable portions of the Fig. 6 structure.

Figure 1:
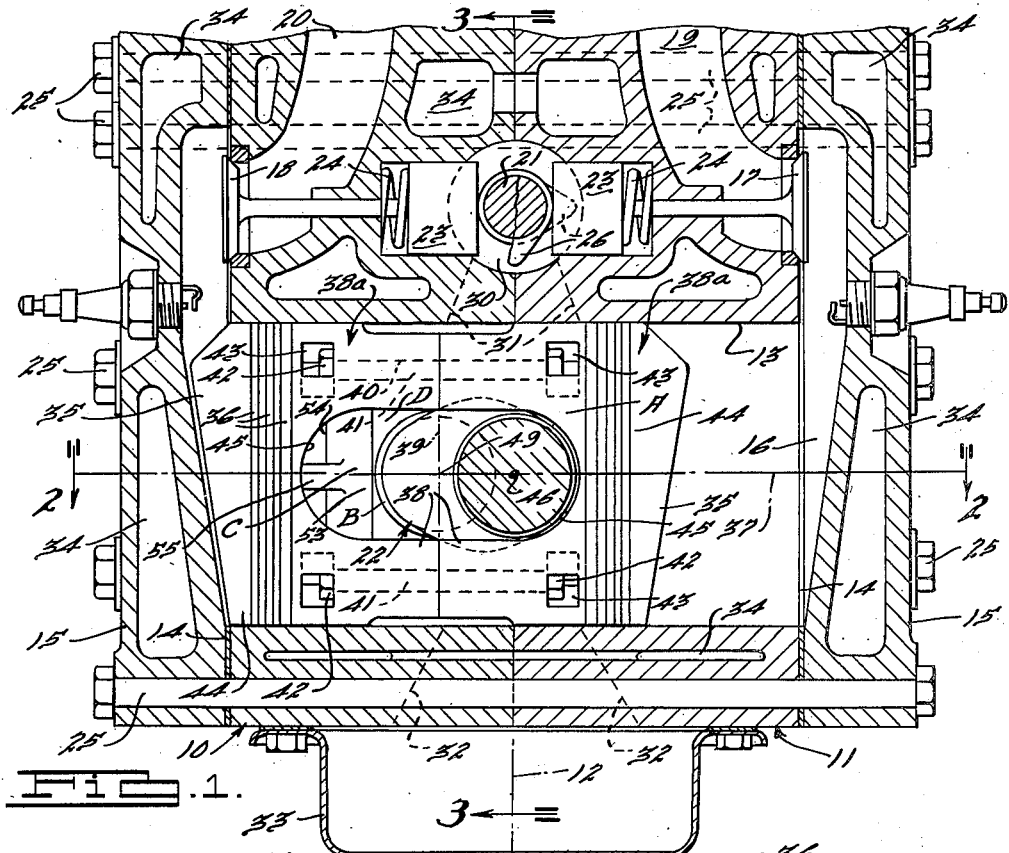
Fig. 1 is a transverse sectional elevational view through the engine cylinder block structure showing a typical cylinder and associated piston.

The engine illustrated in the accompanying drawings is more fully disclosed and claimed in the copending applications of Alexander G. Herreshoff, Serial No. 16,801, filed March 24, 1948, and in my copending applications Serial Nos. 16,645, 16,647, now Patent No. 2,571,198, and 16,650, filed March 24, 1948, and novel features disclosed in my subject application but not claimed herein are set forth in the claims of said copending applications.

In general, the engine comprises a cylinder block structure formed of component or complementary half portions 10 and 11 having planar face contact in a plane 12 which is vertical for the illustrated positioning of the engine. If desired the engine may be positioned with any desired orientation and reference terminology employed herein and referring to vertical, horizontal, or the like, is for convenience of description and not by way of limitation.

Each portion of the cylinder block structure is formed with a half-part of a cylinder 13 of substantially uniform diameter between the opposite side faces 14 of the block structure where each end of the cylinder is closed by a cylinder head 15 providing a combustion chamber 16. Suitable intake and exhaust valves 17, 18 respectively control inlet of fuel mixture from the inlet gas passages 19 to the combustion chambers and discharge of exhaust gas through passages 20 from the combustion chambers. A camshaft 21, driven from the crankshaft 22 at one-half the speed thereof for a four stroke cycle engine, controls the operation of the valves 17, 18 for each of the engine cylinders in conjunction with the tappets 23 and valve springs 24 as will be readily understood.

The block portions 10 and 11 are brought together and the cylinder heads 15 maintained in their illustrated assembled positions by a plurality of through bolt assemblies 25 which extend through the block portions and cylinder heads. The camshaft 21 carries the valve operating cams 26 and has spaced journal portions 27 running in suitable bearings 28 disposed in the mating semi-cylindrical openings 29 of the block portions 10, 11, and between adjacent openings 29 the block portions have the mating half-recesses 30 providing cam chambers from which lubricant may drain through a passage formed by the mating half-passages 31 of the block portions thence to cylinder 13. As will presently be more apparent, any drainage through a passage 31 enters a chamber of the piston structure whence such drainage, along with lubricating oil escaping from the moving parts communicating with such chamber, escapes through a passage formed by the mating half-passages 32 of the block portions to the oil reservoir or sump 33 which is attached to the bottom face of the cylinder block structure.

For an engine of the liquid circulating cooled type, as illustrated, the cylinder heads 15 and block portions 10, 11 are provided with cored intercommunicating coolant passages 34, the contacting faces of the block portions being lapped and wiped with a conventional rubber cement or the like prior to assembly to insure proper alignment of the engine parts and to insure against leakage of coolant and lubricating oil in the plane 12.

Reciprocating within the typical illustrated cylinder 13 is a piston structure A having a head portion 35 at each end thereof respectively cooperating with the combustion chambers 16 of the cylinder heads 15. The piston structure A carries a set of rings 36 adjacent each of its head portions and has its axis 37 coincident with the axis of the cylinder bore 13. The opposite head portions 35 of the double piston structure A are connected by an intermediate body structure herein illustrated as comprising a plurality of piers or tie-portions 38. In the present embodiment of my invention the piston structure A is formed of component similar half-portions 38a brought together by seating the end faces of the piers 38 of one-half portion on the corresponding end faces of the other half portion, the plane of contact 39 being perpendicular or normal with the piston axis 37 although, if desired, the piston structure may be integrally cast as shown in the aforesaid copending Alexander G. Herreshoff application Serial No. 16,801, for example. The built-up type of piston is somewhat preferred to facilitate assembly of the engine especially where a unitary crankshaft 22 is employed in lieu of a built-up sectional type of crankshaft as illustrated in the aforesaid Herreshoff application Serial No. 16,801, or in my copending application Serial No. 16,646, filed March 24, 1948, now Patent No. 2,595,761.

In order to secure the piston portions together, the piers 38 have passages 40 extending axially therein to receive the double-ended bolt assemblies 41 each having its bolt member embedded in the coaxial passages 40 of an abutting pair of piers 38. The bolts are tensioned by the nuts 42 located in the recesses 43 which open inwardly from the skirt portion 44 of each piston portion.

The piston structure A is provided with a pair of diametrically disposed openings or slots 45 in its intermediate body structure, these slots being bounded circumferentially of the piston by a pair of the piers 38 of each piston portion 38a and being elongated axially of the piston structure. The slots 45 receive the crankshaft 22 and accommodate reciprocation of the piston structure A relative to the crankshaft which is rotatable about its axis 46, the crankshaft having journal portions 47 mounted in bearings carried by the component semi-cylindrical openings 48 formed in the cylinder block portions 10 and 11. Associated with each cylinder and piston structure of the engine is a cylindrical crank portion B of the crankshaft, such portion having its axis 49 offset from the crankshaft axis 46 and parallel therewith. Each crank portion B is connected to an adjacent pair of journal portions 47 by the obliquely extending crankshaft portions 50, the crank B and oblique portions 50 being disposed within the hollow chamber 51 of piston structure A intermediate the heads 35 of the double ended piston structure A. It will be apparent that the cylindrical crank portion B presents a bearing surface of revolution 52 having the axis 49 as its axis of generation.

My improved operating connection between piston structure A and crankshaft 22 comprises a slideway or bearing guide C carried by the piston structure and a bearing structure or block D operatively disposed between crank B and slideway C and so constructed and arranged as to provide a sliding rocking bearing connection between the piston structure and crankshaft crank. Where the piston structure A is formed in parts or sections of the form illustrated, the slideway C is then preferably formed by the similar companion slideway portions 53 which are respectively cast with the piston heads 35 and connected therewith by the X-brace formed by flanges or webs 54, 55 each of which is swept into its associated guideway portion 53 in order to fix the slideway C as a rigid part of the piston structure A.

The slideway portions 53 are thus spaced from each other in a direction axially of the piston structure and present bearing surfaces facing each other.

Figure 2:
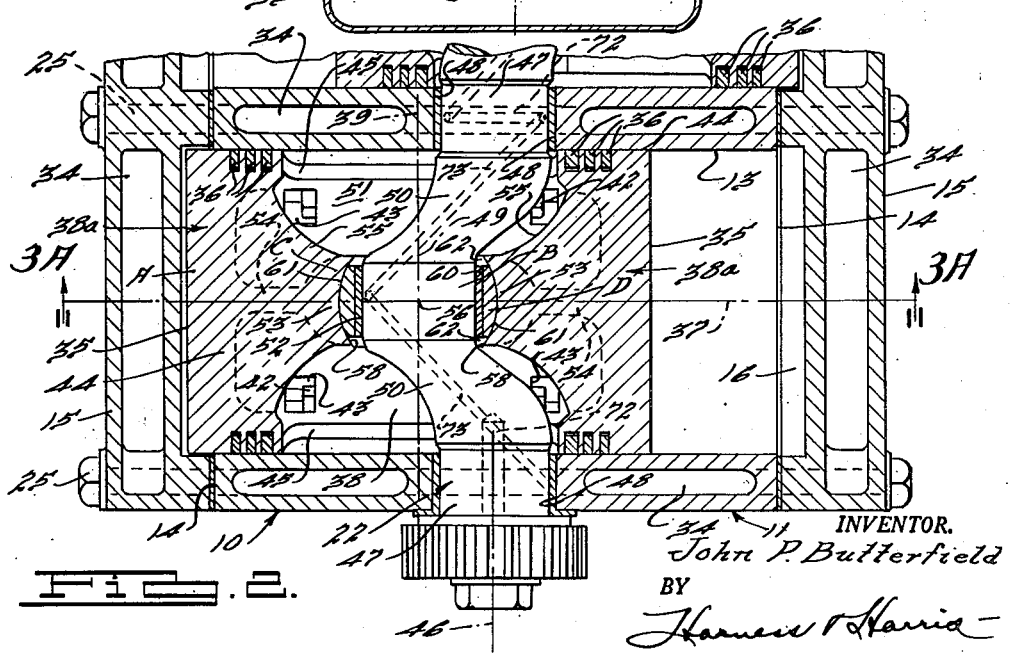
Fig. 2 is a sectional plan view taken as indicated by line 2—2 of Fig. 1.
Figure 3:
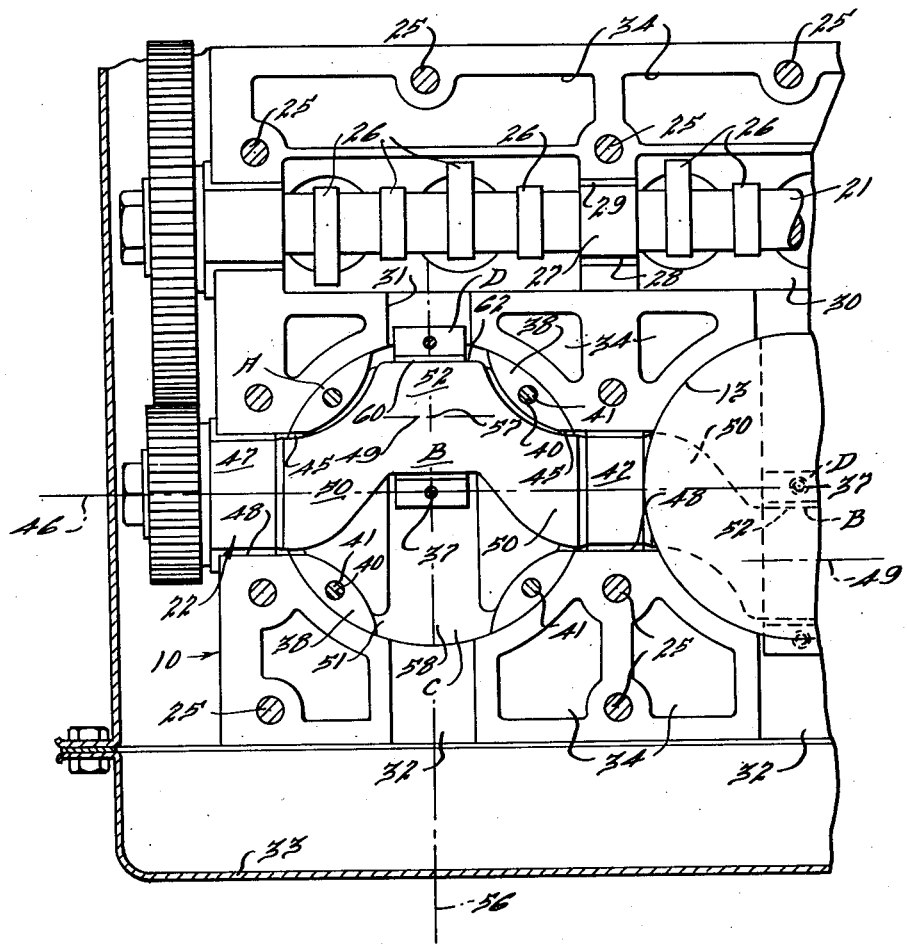
Fig. 3 is a sectional elevational view taken as indicated by line 3—3 of Fig. 1 but illustrating the piston in its mid-stroke position.
Figure 3A:
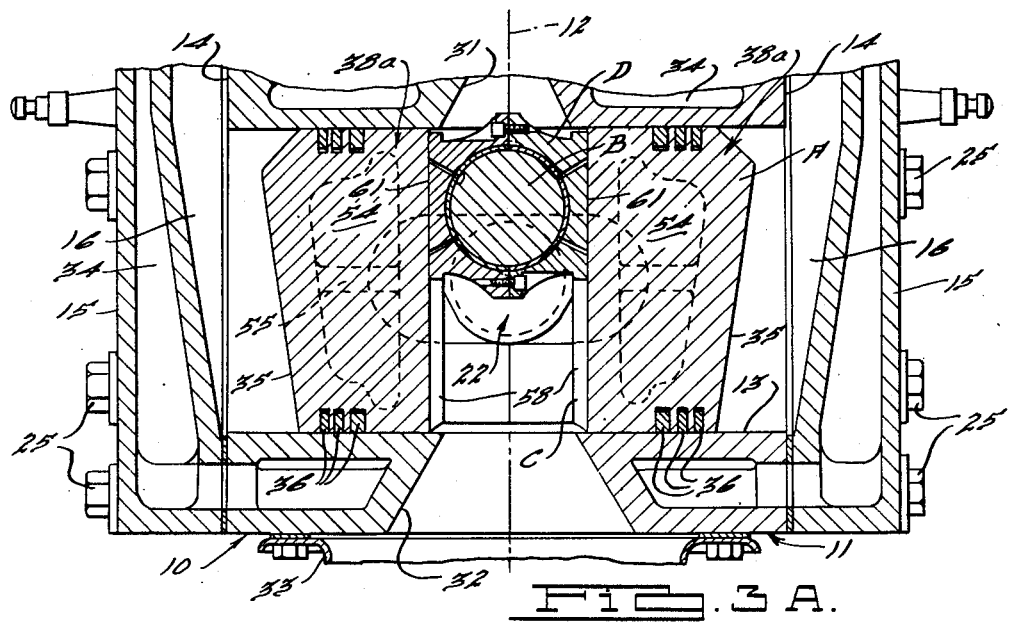
Fig. 3A is a sectional elevational view along line 3A—3A of Fig. 2, but showing the piston in its mid-stroke position.
Figures 4, 5:
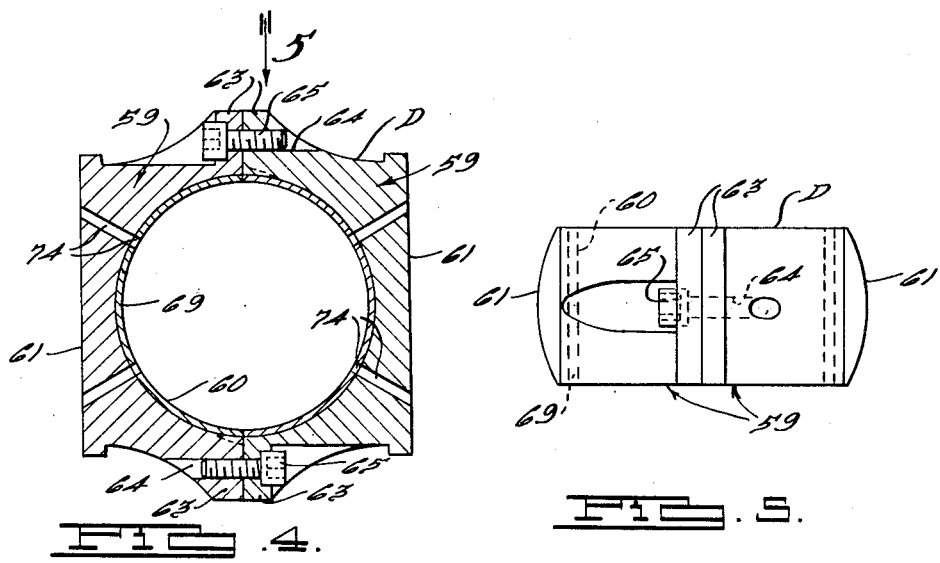
Fig. 4 is an enlarged sectional view of the bearing block structure as seen in Fig. 3.
Fig. 5 is an end elevational view of the Fig. 4 structure, the view being taken as indicated by the arrow on Fig. 4.

The slideway C extends transversely of the piston structure A along an axis 56 which is normal or perpendicular with the cylinder and piston axis 37 and with the axis 49 of crank B. The point of intersection 57 of the axes 56 and 49 includes a point on the axis 37 when the piston structure is disposed at the extreme end positions of its stroke as shown in Fig. 1 such that the three axes 37, 56, and 49 then intersect at a common point. Each slideway portion 53 is provided with a bearing surface of revolution 58 having its longitudinally extending surface elements extending parallel with the slideway axis 56 and being of arcuate formation in planes transverse to the slideway axis 56. Thus, as seen in Fig. 2, each bearing surface 58 is curved in planes parallel with a plane containing the axes 37 and 46 of the cylinder 13 and crankshaft 22. Each surface 58 is a portion of a cylindrical surface having axis 56 as the axis of such cylinder about which the surfaces 58 are developed or generated. As will be seen in Fig. 3 the slideway C extends transversely through the piston, the opposite ends of the slideway being open outwardly between a pair of the piers 38 of each piston portion 38a, the slots 45 extending beyond the guideway C in the direction of the piston axis.

The bearing structure D is formed, for convenience of assembly, of a pair of similar interchangeable portions 59 formed internally with the complementary semi-cylindrical portions of a cylindrical bearing surface of revolution 60 surrounding the crankshaft bearing surface 52 and having a journal bearing fit therewith. Bearing surface 60 is developed or generated about the axis 49 of the bearing surface 52 of the crank B. The portions 59 of bearing structure D are externally formed with the cylindrically arcuate portions of a cylindrical bearing surface of revolution 61 having a rotatable and sliding fit with the slideway bearing surfaces 58. The bearing surfaces 61 of the bearing block portions 59 are generated or developed about the slideway axis 56 and, therefore, what has been said about the elements of surfaces 58 and the relationship of these surfaces 58 with axes 37, 49, and 57 is equally descriptive of surfaces 61. As will be presently more apparent, the bearing structure D is not restricted as to movement axially on crank B in the direction of axis 49 but on the other hand this structure D is free to shift its position along crank bearing surface 52 as well as to rotatably journal the crank at surface 52. Thus a clearance space 62 is provided in the direction of axis 49 to each side of structure D adjacent the opposite ends, in the direction of axis 49, of the engaged portions of bearing surfaces 52 and 60.

Each of the bearing block portions 59 is provided with a connecting portion 63 at opposite sides of and adjacent its semi-cylindrical portion of bearing 60 and each portion 63 is perforated at 64 on an axis parallel with the axis 37 of the piston structure A. When the bearing block portions 59 are assembled the perforations 64 of the connecting portions 63 are in alignment with each other at the opposite sides of bearing 60 to receive the headed connecting members 65 which maintain portions 59 assembled with their portions 63 in contact with each other in a plane normal to axis 37 and containing axis 49.

In the modified form of bearing block structure D' illustrated in Figs. 6 to 9, inclusive, each of the similar and interchangeable block portions 59' have their connecting portions 63' disposed as aforesaid for portions 63 but differing therefrom in that the connecting portions 63' are of hinge-like formation. Thus each portion 59' has a centrally disposed hinge projection 66 at one side and a pair of axially spaced apart hinge projections 67 at its opposite side, the projections 66 and 67 being perforated at 64'. On assembly a connecting member or pin 68 is passed through the aligned perforations of a projection 66 and a pair of projections 67 thereby forming the bearing structure D' as a rigid unit, projection 66 fitting into the space between projections 67 and the axes of pins 68 extending parallel with the axis 37 of the piston structure A. Otherwise, the block D' is similar in design and function to the block D in that it is provided with the aforesaid bearing surfaces 60 and 61. It will be understood that the bearing structures D and D' are illustrative alternatives for use in the connecting means between the piston structure A and crankshaft 22.

As illustrative of practicable examples of materials forming the parts of the operative connecting means and not by way of limitation, I have obtained good results by casting the piston structure A of commercial aluminum alloy ordinarily used to cast pistons in general, the bearing block structure being made of steel and having its cylindrical bearing surfaces 61 hardened. The steel crankshaft 22 has hardened cranks B running in semi-cylindrical bearing inserts 69 of appropriate bearing alloy such as commercial copper, lead, and steel employed in conventional engines for connecting rod and crankshaft main bearings. If desired the piston structure A may also be of cast iron instead of aluminum.

In connection with bearing block D', I have illustrated a modification which, if desired, may be employed in connection with block D. In the block D' the cylindrical bearing surfaces 61 are carried by and formed as a part of a cast iron insert or facing shoe 70 which is secured to each bearing block portion 59'. The shoes 70 are placed in a mold and the aluminum alloy is then poured to form the aluminum block portions 59'. The shoes 70 have enlarged anchors 71 embedded in the portions 59' during the casting operation of the portions 59' to provide a unitary assembly of each portion 59' and its bearing shoe 70. As an example of use with such an arrangement the piston structure A may be formed of aluminum as aforesaid, the aluminum portions 59' having their bearing surfaces 60 journaling the hardened steel cranks B.

Lubricant is supplied under pressure by the system of oil passages 72, 73, 74 extending through the crankshaft to its journals 47 and also to the engaged pairs of bearing surfaces 52, 60 and 58, 61.

My connecting means between the piston structure A and crankshaft 22 has the advantage of providing the desirable cylindrical bearing at surfaces 52 and 60 for the relatively high speed rubbing action at the crank B and yet provides a universal self-alignment for the operating parts from the crankshaft to the piston structure. On the other hand the piston is maintained against unrestrained or excessive rotation about its axis which would be undesirable as requiring excessive clearance between the oblique crankshaft portions 50 and the piston piers 38 when the crank B is in the vicinity of its mid-stroke positions.

My connecting means provides the three degrees of rotational freedom sufficient to insure proper alignment between all pairs of the working surfaces which are (a) crank bearing surface 52 and bearing block surface 60, (b) cylinder 13 and the cylindrical surfaces of the piston structure A engaged therewith, and (c) cylindrical surfaces 58 of slideway C and the mating surfaces 61 of the bearing block. These pairs of surfaces (a), (b), and (c) are respectively generated about axes 49, 37, and 56 which in Fig. 2 are seen to have a common center which is the intersection of these axes.

Accordingly the surfaces (a) are, of course, relatively rotatable about the crankpin axis 59, surfaces (b) about axis 37, and surfaces (c) about axis 56. Inasmuch as the bearing block structure is unrestrained axially of the crank B, this bearing block is free to assume an unrestrained position on the crank and is positioned by the slideway C of the piston structure A. Furthermore, the piston structure and bearing block are free to oscillate about their respective axes 37 and 56 during operation of the engine to compensate for any misalignment due to deflections under load or manufacturing tolerances between the desired truly parallel relationship of axes 46 and 49. Likewise such arrangement is self-compensating for misalignment in the desired true perpendicular relationship between cylinder axis 37 and crankshaft axis 46 or for any other misalignments in the parts from the cylinder to the crankshaft and including the piston structure A and bearing block structure D or D'. The arrangement is such, for example, as to freely permit relative tilting between the piston structure A and crankshaft 22 in a plane containing the axis 46 of the crankshaft and the axis 37 of cylinder 13, and because of the aforesaid three degrees of freedom any other relative misalignments will also be compensated for by permitting relative tilt of the parts in any plane thus providing universal self-alignment between the crankshaft and piston structure.

I claim:

1. A bearing block structure for operably connecting a cylindrical crank pin with a piston slideway structure carried interiorly of the piston, comprising a pair of complementary, engageable, block portions adapted to encircle said crank pin and to be slidably mounted in said slideway structure, each block portion including a complementary portion of a cylindrical opening formed in an interiorly disposed end edge thereof which opening extends transversely of the block structure and is adapted to journal a portion of the crank pin, each block portion also having a cylindrically curved bearing surface formed across the opposite end edge thereof, each bearing surface being generated about an axis that is perpendicular to and intersects the crank pin axis, each bearing surface extending longitudinally of the block and being adapted to be slidably and rockably engaged with a mating, cylindrically curved bearing surface carried by the slideway structure of the piston, and longitudinally extending, perforated, interengageable, block connecting formations projecting from each side edge of each block portion arranged so that the perforations in the projections of the complementary block portions on each side edge of the blocks will extend parallel to the direction of the crank pin journal opening through the block and be aligned when the block portions are assembled on the crank pin, and a connecting pin extending through each set of aligned perforations to connect the block portions together.

2. A bearing block structure for operably connecting a cylindrical crank pin with a slideway structure carried interiorly of a piston, comprising a pair of complementary block portions each formed with a complementary portion of a cylindrical opening in an end edge thereof which opening extends transversely of the block structure and is adapted to journal a portion of the crank pin, each block portion also having a cylindrically curved bearing surface formed across the opposite end edge thereof, each bearing surface being generated about an axis that is perpendicular to and intersects the crank pin axis, each block bearing surface extending longitudinally of the block and being adapted to be slidably and rockably engaged with a mating cylindrically curved bearing surface carried by the slideway structure of the piston, and perforated connecting projections extending from each side edge of each block portion arranged so that the perforations in the projections of the complementary block portions on each side of the blocks will extend parallel to the journal opening through the block and be aligned when the block portions are assembled on the crank pin, and a connecting pin extending through each set of aligned perforations to connect the block portions together, and radially extending lubrication passages extending through each block portion from the crank pin journal opening to the curved bearing surface along the opposite end edges of each block.

JOHN P. BUTTERFIELD.

REFERENCES CITED

The following references are of record in the file of this patent:

UNITED STATES PATENTS

| Number | Name | Date |
| --- | --- | --- |
| 677,338 | Clay | July 2, 1901 |
| 727,739 | Blanding | May 12, 1903 |
| 968,437 | Wellman | Aug. 23, 1910 |
| 1,182,057 | Thomson | May 9, 1916 |
| 1,440,747 | Rogatchoff | Jan. 2, 1923 |
| 1,578,228 | Yearsley | Mar. 23, 1926 |
| 1,710,721 | Bosmans | Apr. 30, 1929 |
| 2,439,003 | Hawold | Apr. 6, 1948 |